United States Patent
Davis (10) Patent No.: US 9,759,080 B2
(45) Date of Patent: Sep. 12, 2017

(54) ANNULAR CARTRIDGE SEAL

(71) Applicant: United Technologies Corporation, Hartford, CT (US)

(72) Inventor: Timothy M. Davis, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/048,544

(22) Filed: Feb. 19, 2016

(65) Prior Publication Data

US 2016/0169022 A1    Jun. 16, 2016

Related U.S. Application Data (63) Continuation of application No. PCT/US2014/060722, filed on Oct. 15, 2014.

(60) Provisional application No. 61/895,317, filed on Oct. 24, 2013.

(51) Int. Cl.
| | |
|---|---|
| *F16J 15/08* | (2006.01) |
| *F01D 11/00* | (2006.01) |
| *F16J 15/02* | (2006.01) |
| *F16J 15/06* | (2006.01) |

(52) U.S. Cl.
CPC .......... *F01D 11/005* (2013.01); *F01D 11/003* (2013.01); *F16J 15/028* (2013.01); *F16J 15/061* (2013.01); *F16J 15/067* (2013.01); *F16J 15/0887* (2013.01); *F05D 2220/32* (2013.01); *F05D 2240/55* (2013.01); *F05D 2250/184* (2013.01)

(58) Field of Classification Search
CPC .. F16J 15/16; F16J 15/166; F16J 15/32; F16J 15/3208; F16J 15/3216; F01D 11/003; F01D 11/005; F05D 2220/32; F05D 2240/55; F05D 2250/184
See application file for complete search history.

(56) References Cited

U.S. PATENT DOCUMENTS

| | | | |
|---|---|---|---|
| 3,045,966 A | 7/1962 | Swatman | |
| 3,761,100 A * | 9/1973 | Taylor | F16J 15/38 277/373 |
| 3,887,299 A | 6/1975 | Profant | |

(Continued)

FOREIGN PATENT DOCUMENTS

EP    2133606    12/2009

OTHER PUBLICATIONS

International Preliminary Report on Patentability dated Apr. 26, 2016 in Application No. PCT/US2014/060722.

(Continued)

*Primary Examiner* — Gilbert Lee
(74) *Attorney, Agent, or Firm* — Snell & Wilmer, L.L.P.

(57) ABSTRACT

A seal for a gas turbine engine may include a first cartridge, a second cartridge, and a wave spring. The wave spring may be located between the first cartridge and the second cartridge. The first cartridge may contact a first component to form a seal. The second cartridge may contact a second component to form a seal. The first cartridge may contact the second cartridge to form a seal. The wave spring may force the first cartridge to contact the first component, and the wave spring may force the second cartridge to contact the second component.

19 Claims, 5 Drawing Sheets

(56) References Cited

U.S. PATENT DOCUMENTS

| | | | | |
|---|---|---|---|---|
| 4,602,795 | A * | 7/1986 | Lillibridge | F16J 15/0887 |
| | | | | 277/644 |
| 4,917,389 | A | 4/1990 | Baker et al. | |
| 5,078,412 | A * | 1/1992 | Baumgarth | F02K 1/805 |
| | | | | 239/127.1 |
| 6,237,921 | B1 | 5/2001 | Liotta et al. | |
| 6,431,825 | B1 | 8/2002 | McLean | |
| 7,080,513 | B2 * | 7/2006 | Reichert | F01D 9/023 |
| | | | | 277/628 |
| 7,163,206 | B2 | 1/2007 | Cross et al. | |
| 9,051,968 | B2 * | 6/2015 | Sundholm | F16C 25/04 |
| | | | | 277/500 |
| 9,249,831 | B2 * | 2/2016 | Cymbal | F16C 33/30 |
| 2009/0096174 | A1 | 4/2009 | Spangler et al. | |
| 2010/0253005 | A1 | 10/2010 | Liarakos et al. | |
| 2012/0195743 | A1 | 8/2012 | Walunj et al. | |
| 2013/0075975 | A1 | 3/2013 | Hilaris et al. | |
| 2013/0170775 | A1 * | 7/2013 | Cymbal | F16C 33/30 |
| | | | | 384/456 |

OTHER PUBLICATIONS

International Search Report and Written Opinion dated Jan. 6, 2015 in Application No. PCT/US2014/060722.
Extended European Search Report dated Oct. 25, 2016 in European Application No. 14856494.1.

\* cited by examiner

ANNULAR CARTRIDGE SEAL

CROSS-REFERENCE TO RELATED APPLICATIONS

This application is a continuation of, claims priority to and the benefit of, PCT/US2014/060722 filed on Oct. 15, 2014 and entitled "ANNULAR CARTRIDGE SEAL," which claims priority from U.S. Provisional Application No. 61/895,317 filed on Oct. 24, 2013 and entitled "ANNULAR CARTRIDGE SEAL." Both of the aforementioned applications are incorporated herein by reference in their entirety.

FIELD OF INVENTION

The present disclosure relates generally to gas turbine engines. More particularly, the present disclosure relates to seals in gas turbine engines.

BACKGROUND OF THE INVENTION

Different types of seals are used at various locations and for various purposes throughout a gas turbine engine. For example, some seals are used to separate different fluids, while other seals are used to separate regions of disparate fluid pressure. Regardless of the particular configuration, a typical concern in choosing a seal for a particular application is sealing effectiveness, i.e., the degree to which the seal accomplishes the intended purpose, as well as seal durability.

SUMMARY OF THE INVENTION

A seal may comprise a first cartridge, a second cartridge, and a spring. The second cartridge may be movable relative to and configured to sealingly engage the first cartridge. The seal may be between and contacting the first and second cartridges and configured to bias the first cartridge in a first direction and the second cartridge in a second direction.

A seal for a gas turbine engine may comprise a first annular cartridge, a second annular cartridge, and an annular wave spring. The first annular cartridge may have a radially inner wall, a radially outer wall, and a lateral wall extending between and connecting the radially inner and outer walls of the first annular cartridge. The second annular cartridge may have a radially inner wall, a radially outer wall, and a lateral wall extending between and connecting the radially inner and outer walls of the second annular cartridge.

A gas turbine engine may comprise a first gas turbine engine component, a second gas turbine engine component, and an annular seal. The annular seal may be positioned between the first and second components. The annular seal may comprise a first cartridge, a second cartridge, and a wave spring. The first cartridge may be configured to form a first seal with the first gas turbine engine component. A wall of the second cartridge may be configured to form a second seal with the second gas turbine engine component. The wave spring may be configured to exert a biasing force on the first cartridge toward the first gas turbine engine component and a biasing force on the second cartridge toward the second gas turbine engine component. The annular seal may fluidly isolate low and high pressure regions at least partially defined by the first and second components on opposite sides of the annular seal.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
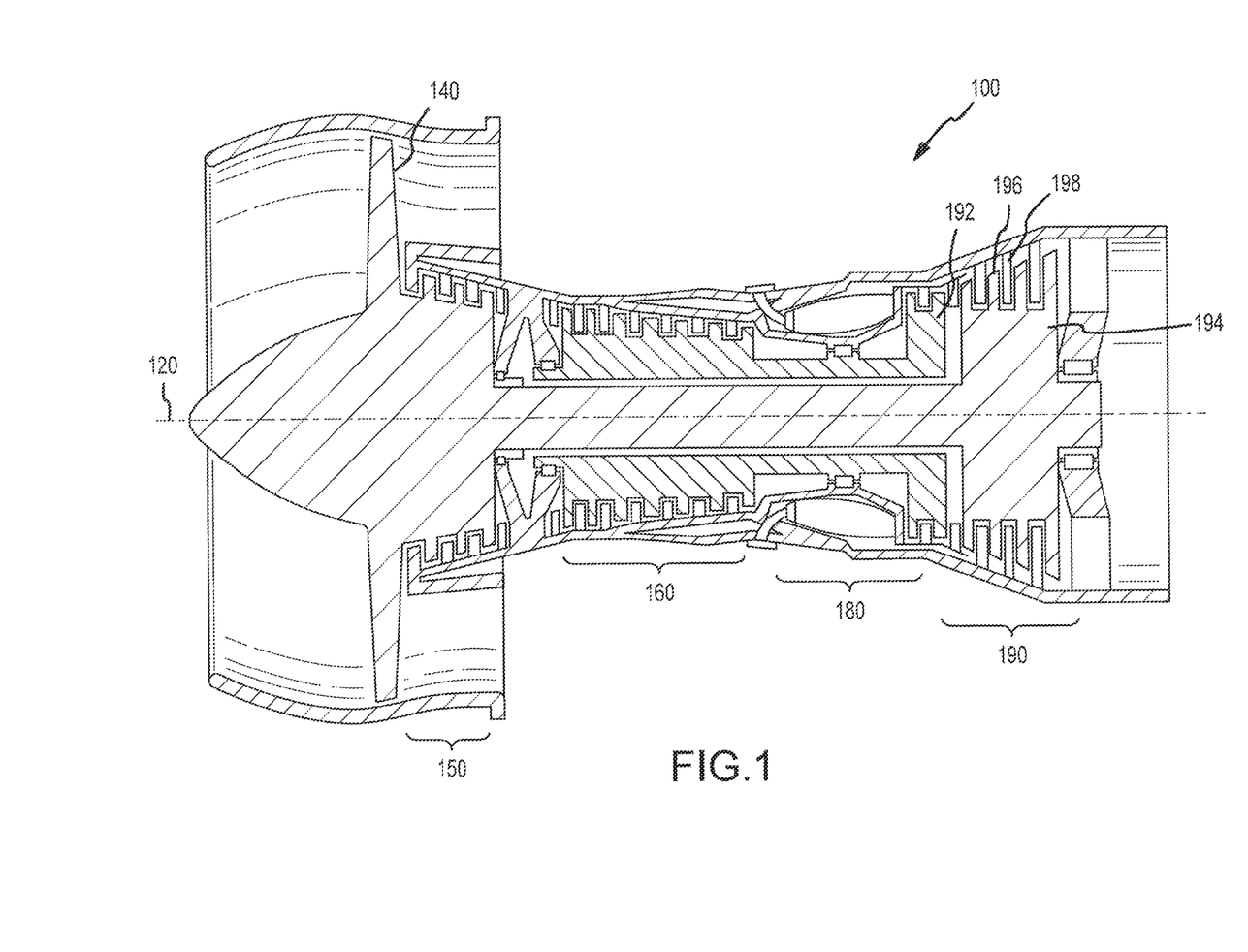
FIG. 1 illustrates a schematic cross-section view of a gas turbine engine in accordance with various embodiments.

Referring to FIG. 1, a gas turbine engine 100, such as a turbofan gas turbine engine, is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and a turbine section 190. Air compressed in the compressor sections 150, 160 may be mixed with fuel and burned in combustion section 180 and expanded across turbine section 190. Turbine section 190 may include high pressure rotors 192 and low pressure rotors 194, which rotate in response to the expansion. Turbine section 190 may comprise alternating rows of rotary airfoils or blades 196 and static airfoils or vanes 198. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
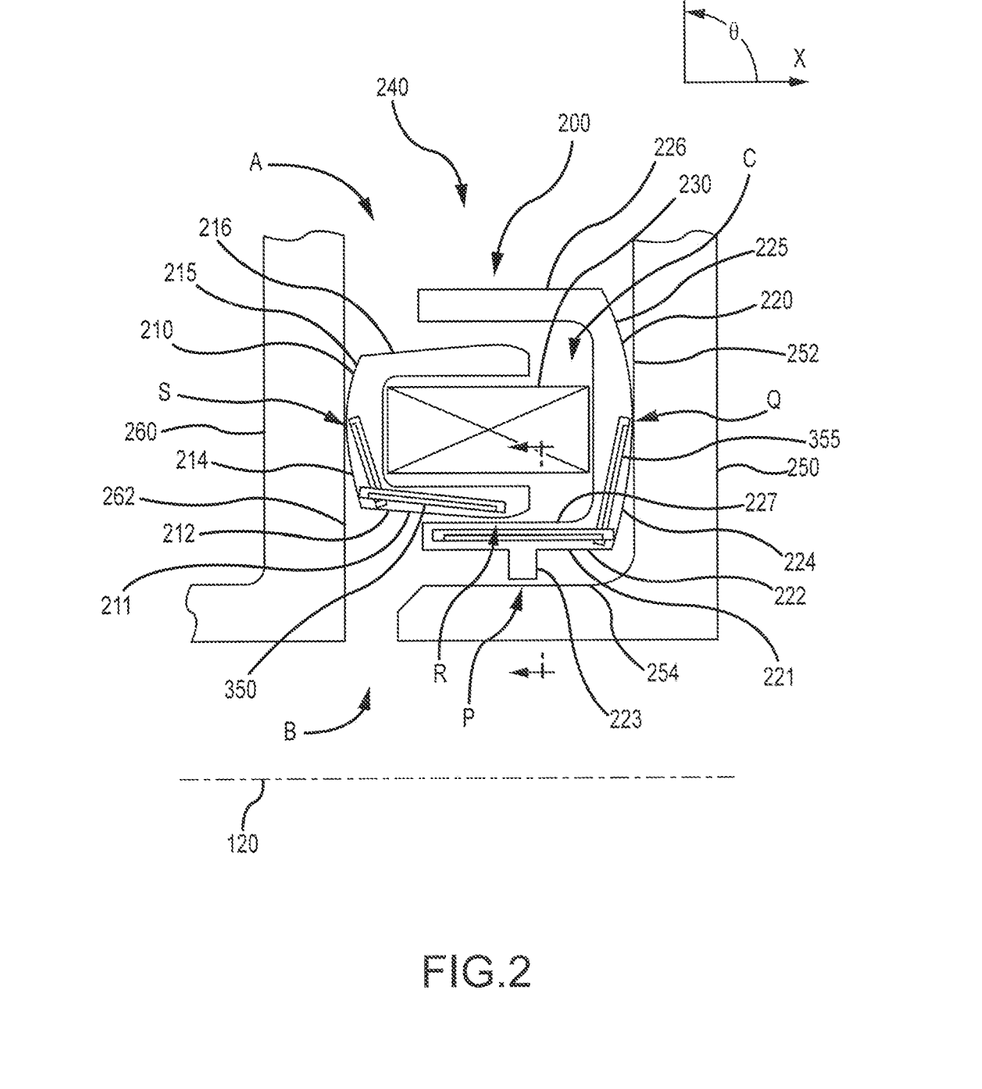
FIG. 2 illustrates a schematic cross-section view of a seal assembly in accordance with various embodiments.

Referring to FIG. 2, a schematic cross-section of a seal 200 for use in, e.g., a gas turbine engine, is illustrated according to various embodiments. Seal 200 may comprise forward cartridge 210, aft cartridge 220, and wave spring 230, which is schematically depicted in FIG. 2 and further discussed below with respect to FIG. 4. Seal 200 may be located within seal cavity 240. Seal cavity 240 may be formed by adjacent components in a gas turbine engine. In various embodiments, seal cavity 240 may be formed by a forward surface 252 of an aft component 250, a radially inner surface 254 of aft component 250, and an aft surface 262 of a forward component 260. In various embodiments, forward component 260 and aft component 250 may comprise components of gas turbine engine 100. In various embodiments, aft component 250 may comprise, for example, a portion of a turbine vane assembly. In various embodiments, forward component 260 may comprise a portion of a blade outer air seal assembly ("BOAS"). A BOAS may provide a seal between rotor blade tips and an outer case to maintain core gas flow between rotor blades. However, in various embodiments, seal 200 may be utilized to seal any suitable seal cavity between any type of components.

In various embodiments, seal 200 may comprise an annular seal which is annular about axis of rotation 120. In various embodiments, seal 200 may be configured to decrease transfer of fluid from a relatively high pressure region A to a relatively low pressure region B. In various embodiments, high pressure region A may comprise secondary cooling air used to cool various engine components. In various embodiments, low pressure region B may comprise a high temperature gas path, wherein hot gases transfer kinetic energy to the turbine section of a gas turbine engine.

Forward cartridge 210 may comprise lateral wall 214, radially inner wall 212 coupled to lateral wall 214, and radially outer wall 216 coupled to lateral wall 214. Forward cartridge 210 may comprise a gape, defined as a distance of an opening between radially inner wall 212 and radially outer wall 216. Forward cartridge 210 may be oriented such that the gape is located aft of lateral wall 214.

Aft cartridge 220 may comprise lateral wall 224, radially inner wall 222 coupled to lateral wall 224, and radially outer wall 226 coupled to lateral wall 224. Aft cartridge 220 may comprise a gape, defined as a distance between radially inner wall 222 and radially outer wall 226. Aft cartridge 220 may be oriented such that the gape of aft cartridge is located forward of lateral wall 224. In various embodiments, the gape of aft cartridge 220 may be greater than the gape of forward cartridge 210, such that radially inner wall 212 and radially outer wall 216 of forward cartridge 210 may be located between radially inner wall 222 and radially outer wall 226 of aft cartridge 220. However, in various embodiments, the gape of aft cartridge 220 may be less than the gape of forward cartridge 210, such that radially inner wall 222 and radially outer wall 226 of aft cartridge 220 may be located between radially inner wall 212 and radially outer wall 216 of forward cartridge 210. In various embodiments, at least one of forward cartridge 210 and aft cartridge 220 may comprise a nickel alloy or a cobalt alloy. In various embodiments, at least one of forward cartridge 210 and aft cartridge 220 may comprise a non-hardenable alloy. In various embodiments, non-hardenable alloys may maintain their material properties at higher temperatures than hardenable alloys.

In various embodiments, a difference in pressure between high pressure region A and low pressure region B may result in net directional forces on seal 200. The pressure differential may force aft cartridge 220 in a radially inward direction (i.e. in the negative y-direction with respect to the x-y axes provided for ease of illustration). The force on aft cartridge 220 in the radially inward direction may cause a radially inner surface 221 of radially inner wall 222 of aft cartridge 220 to contact radially inner surface 254 of aft component 250 at contact point P. In various embodiments, aft cartridge 220 may comprise a contact member 223 extending radially inward from radially inner surface 221 which provides the contact at point P. However, in various embodiments contact member 223 is not present, and radially inner surface 221 provides the contact at point P between radially inner surface 221 and radially inner surface 254. Point P may comprise a first sealing location which restricts transfer of fluid between high pressure region A and low pressure region B.

The pressure differential may additionally force aft cartridge 220 in the aft direction (i.e. in the positive x-direction) with respect to aft component 250. Thus, the pressure differential may cause aft surface 225 of lateral wall 224 to contact forward surface 252 of aft component 250 at contact point Q. Point Q may comprise a second sealing location which restricts transfer of fluid between high pressure region A and low pressure region B. Therefore, contact between aft cartridge 220 and aft component 250 at point P and point Q may decrease fluid from flowing between aft cartridge 220 and aft component 250.

The pressure differential between high pressure region A and low pressure region B may also provide forces on forward cartridge 210. In various embodiments, the pressure differential may provide a force on forward cartridge 210 in the radially inward direction. The force in the radially inward direction may cause radially inner surface 211 of radially inner wall 212 of forward cartridge 210 to contact radially outer surface 227 of radially inner wall 222 of aft cartridge 220 at contact point R. Point R may comprise a third sealing location which restricts transfer of fluid between high pressure region A and low pressure region B. Therefore, contact between forward cartridge 210 and aft cartridge 220 at point R may decrease fluid from flowing between forward cartridge 210 and aft cartridge 220 from high pressure region A into low pressure region B.

The pressure differential may additionally force forward cartridge 210 in the forward direction (i.e. in the negative x-direction) with respect to forward component 260. Thus, the pressure differential may cause forward surface 215 of lateral wall 214 to contact aft surface 262 of forward component 260 at contact point S. Point S may comprise a fourth sealing location which restricts transfer of fluid between high pressure region A and low pressure region B. Therefore, contact between forward cartridge 210 and forward component 260 at contact point S may restrict fluid from flowing between forward cartridge 210 and forward component 260 from high pressure region A into low pressure region B. In various embodiments, at least one of aft surface 225, forward surface 215, radially inner surface 221, and radially inner surface 211 may be curved. Thus, in various embodiments, forward cartridge 210 and/or aft cartridge 220 may rotate clockwise or counter-clockwise in the θ-direction and still maintain contact at or near points P, Q, R, and S. As further discussed below with respect to FIG. 4, the cartridges 210, 220 may also be biased toward respective components by wave spring 230.

In various embodiments, the pressure differential between high pressure region A and low pressure region B may force forward cartridge 210 in the inward (negative-y) direction such that radially inner surface 221 contacts radially outer surface 227 of radially inner wall 222 and forms a seal at point R, and such that radially outer wall 216 does not contact radially outer wall 226, allowing fluid to flow from high pressure region A to interior region C. Thus, the pressure in interior region C may be substantially equal to the pressure in high pressure region A and greater than the pressure in low pressure region B. The pressure differential between interior region C and low pressure region B may therefore bias forward cartridge 210 in the forward direction and aft cartridge 220 in the aft direction.

Figure 3A:
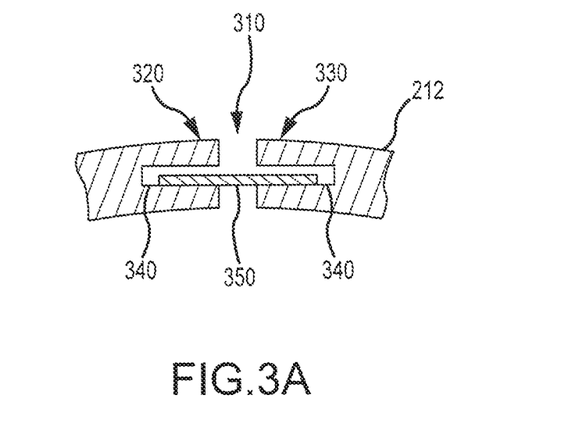
FIG. 3A illustrates a schematic cross-section view of a gap in a forward cartridge in accordance with various embodiments.

Referring to FIG. 3A, a schematic axial cross-section view of radially inner wall 212 of forward cartridge 210 is illustrated according to various embodiments. In various embodiments, forward cartridge 210 may comprise a split hoop, such that forward cartridge 210 does not comprise a continuous annular component, but rather defines a gap 310 at a circumferential location. Gap 310 may allow forward cartridge 210 to expand or contract thermally while maintaining contact with the other components. In various embodiments, a first end 320 and a second end 330 of forward cartridge 210 may define slots 340. A bridge 350 may be located within slots 340. Bridge 350 may decrease fluid from passing through gap 310. In various embodiments, bridge 350 may comprise sheet metal. Referring back to FIG. 2, in various embodiments, bridge 350 may be substantially L-shaped, such that bridge 350 may be located within radially inner wall 212 and lateral wall 214 of forward cartridge 210.

Figure 3B:
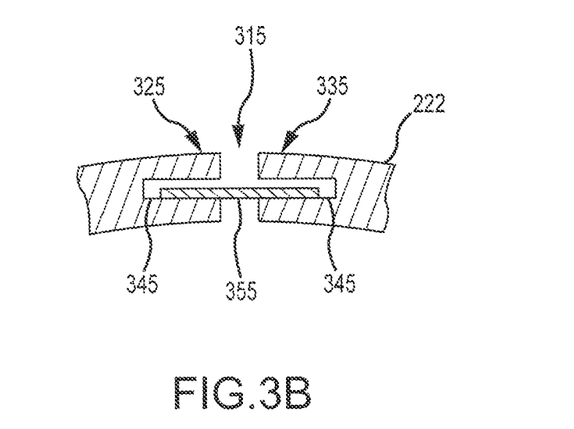
FIG. 3B illustrates a schematic cross-section view of a gap in an aft cartridge in accordance with various embodiments.

Referring to FIG. 3B, a schematic axial cross-section view of radially inner wall 222 of aft cartridge 220 is illustrated according to various embodiments. In various embodiments, aft cartridge 220 may comprise a split hoop, such that aft cartridge 220 does not comprise a continuous annular component, but rather comprises a gap 315 at a circumferential location. Gap 315 may allow aft cartridge 220 to expand or contract thermally while maintaining contact with the other components. In various embodiments, a first end 325 and a second end 335 of aft cartridge 220 may define slots 345. A bridge 355 may be located within slots 345. Bridge 355 may decrease fluid from passing through gap 315. In various embodiments, bridge 355 may comprise sheet metal. Referring back to FIG. 2, in various embodiments, bridge 355 may be substantially L-shaped, such that bridge 355 may be located within radially inner wall 222 and lateral wall 224 of aft cartridge 220.

Figure 4:
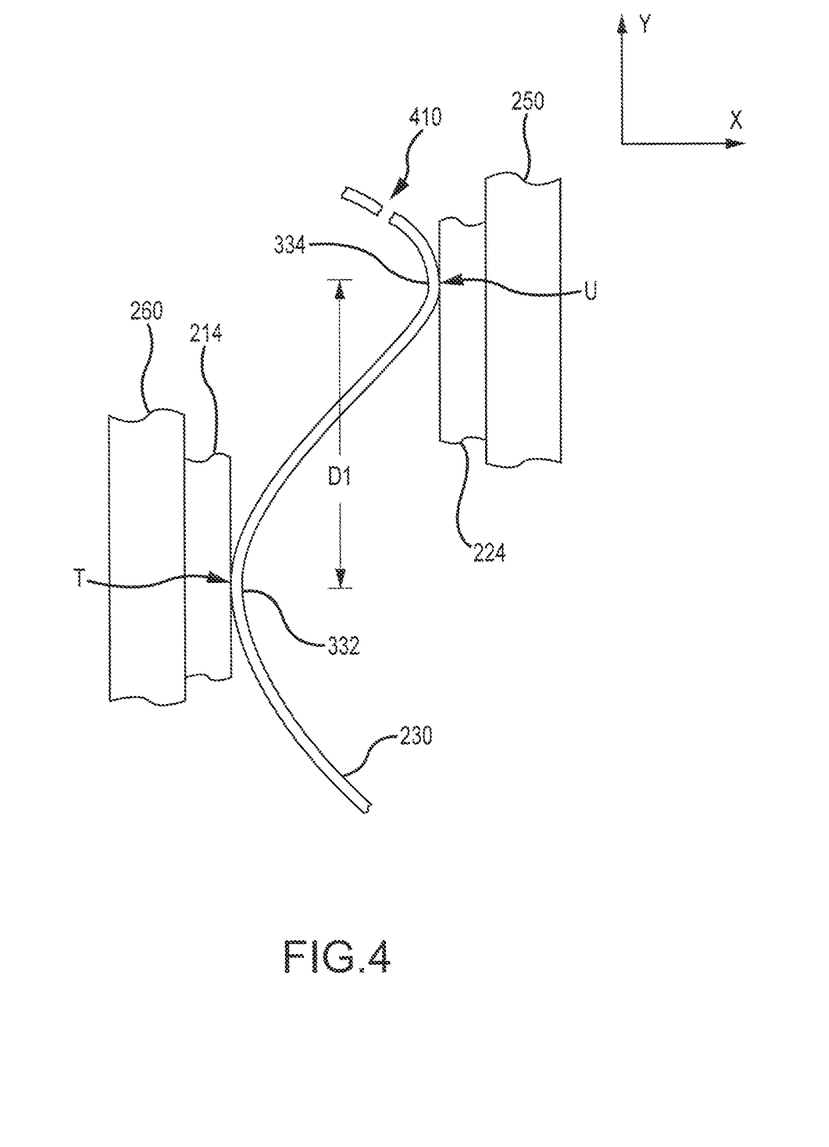
FIG. 4 illustrates a schematic cross-section view of a wave spring in accordance with various embodiments.

Referring to FIG. 4, a schematic view of wave spring 230 is illustrated according to various embodiments. In various embodiments, wave spring 230 may comprise a shape of a sinusoidal wave. In various embodiments, wave spring 230 may be an annular component comprising a hoop about axis of rotation 120 (FIG. 2). In various embodiments, wave spring 230 may comprise a split hoop, such that wave spring 230 does not comprise a continuous annular component, but rather comprises a gap 410 at a circumferential location. In various embodiments, wave spring 230 may comprise carbon steel, stainless steel, beryllium copper, an austenitic nickel-chromium-based superalloy, a titanium alloy, or any other material suitable for high temperatures.

Alternating nodes of wave spring 230 may contact lateral wall 214 of forward cartridge 210 and lateral wall 224 of aft cartridge 220. In various embodiments, a first node 332 of wave spring 230 may contact lateral wall 214 at contact point T, and a second node 334 of wave spring 230 may contact lateral wall 224 at contact point U. In various embodiments, a wavelength of wave spring may be between about 0.5 inches-1.0 inches (1.3-2.5 cm), such that a distance D1 between first node 332 and second node 334 may be between about 0.25 inches-0.5 inches (0.64 cm-2.5 cm). However, in various embodiments wave spring 230 may comprise any suitable wavelength, such as between 0.01 inches-2.0 inches (0.025 cm-5.1 cm). Wave spring 230 may be at least partially compressed. Thus, an elasticity of wave spring 230 may apply a force on lateral wall 214 in the forward direction (negative x-direction), causing lateral wall 214 to contact forward component 260. Similarly, wave spring 230 may apply a force on lateral wall 224 in the aft direction (positive x-direction), causing lateral wall 224 to contact aft component 250. Thus, in addition to the pressure differential described with respect to FIG. 2, wave spring 230 may assist in causing forward cartridge 210 and aft cartridge 220 to seal with forward component 260 and aft component 250 respectively. Additionally, in various embodiments, wave spring 230 may cause forward cartridge 210 and aft cartridge 220 to seal with forward component 260 and aft component 250 respectively in instances of low differences in pressure between high pressure region A and low pressure region B, such as during engine shutdown.

Figure 5:
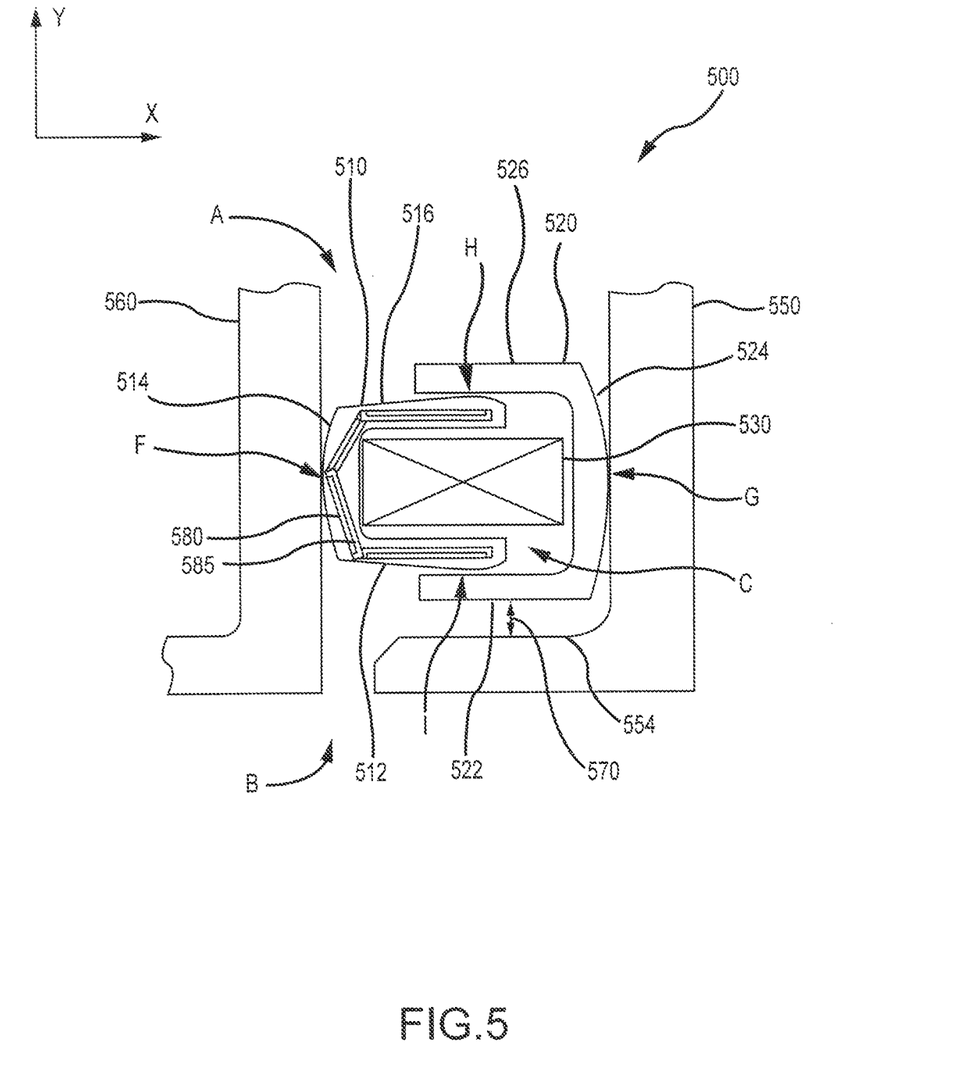
FIG. 5 illustrates a schematic cross-section view of a seal assembly with a full hoop aft cartridge in accordance with various embodiments.

Referring to FIG. 5, a schematic cross-section view of a seal 500 having a full hoop aft cartridge 520 is illustrated according to various embodiments. Seal 500 may comprise aft cartridge 520, forward cartridge 510, and wave spring 530. Forward cartridge 510 may comprise lateral wall 514, radially inner wall 512 coupled to lateral wall 514, and radially outer wall 516 coupled to lateral wall 514. Aft cartridge 520 may comprise lateral wall 524, radially inner wall 522 coupled to lateral wall 524, and radially outer wall 526 coupled to lateral wall 524. Seal 500 may form a seal between aft component 550 and forward component 560.

Alternating nodes of wave spring 530 may contact lateral wall 514 of forward cartridge 510 and lateral wall 524 of aft cartridge 520. An elasticity of wave spring 530 may apply a force on lateral wall 514 in the forward direction (negative x-direction), causing lateral wall 514 to contact forward component 560 at contact point F. Similarly, wave spring 530 may apply a force on lateral wall 524 in the aft direction (positive x-direction), causing lateral wall 524 to contact aft component 550 at contact point G. Thus, wave spring 530 may assist in causing forward cartridge 510 and aft cartridge 520 to seal with forward component 560 and aft component 550 respectively.

In various embodiments, aft cartridge 520 may be positioned such that a gap 570 exists between radially inner wall 522 and a radially inner surface 554 of aft component 550. Gap 570 may allow for relative radial growth between aft cartridge 520 and aft component 550.

In various embodiments, forward cartridge 510 may comprise a split hoop. One or more sealing components 580 may be located within slots 585. Slots 585 may be located adjacent to a gap between ends of forward cartridge 510. Sealing components 585 may bridge the gap and may restrict fluid transfer between relatively high pressure region A and seal interior region C through the gap in forward cartridge 510, as well as between seal interior region C and relatively low pressure region B. In various embodiments, sealing components 580 may be located within radially inner wall 512, lateral wall 514, and radially outer wall 516 of forward cartridge 510. In various embodiments, forward cartridge 510 may be sized and located such that radially outer wall 516 contacts or maintains minimal clearance with radially outer wall 526 at point H, such that fluid transfer is restricted between relatively high pressure region A and seal interior region C at point H. Additionally, forward cartridge 510 may be sized and located such that radially inner wall 512 contacts or maintains minimal clearance with radially inner wall 522 at point I, such that fluid transfer is restricted between seal interior region C and relatively low pressure region B at point I.

In various embodiments, forward cartridge 510 and aft cartridge 520 may form a partial seal at point H, such that fluid transfer is limited, but not completely prevented between relatively high pressure region A and interior region C. Thus, a pressure at interior region C may be less than the pressure in relatively high pressure region A, yet greater than the pressure in relatively low pressure region B. Therefore, the pressure differential between region C and region B may bias forward cartridge 510 in the forward direction and aft cartridge 520 in the aft direction.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A seal, comprising:
   a first cartridge comprising a radially inner wall and a radially outer wall,
      wherein the first cartridge comprises a first end having a first slot,
      wherein the first cartridge comprises a second end having a second slot;
   a bridge located at least partially within the first slot and at least partially within the second slot;
   a second cartridge movable relative to and configured to sealingly engage the first cartridge, wherein the radially inner wall of the first cartridge and the radially outer wall of the first cartridge are located at least partially within a gape of the second cartridge; and
   a spring between and contacting the first and second cartridges and configured to bias the first cartridge in a first direction and the second cartridge in a second direction.

2. The seal of claim 1, wherein a first node of the spring contacts a lateral wall of the first cartridge, and wherein a second node of the wave spring contacts a lateral wall of the second cartridge.

3. The seal of claim 1, wherein the second cartridge comprises a radially inner wall and a radially outer wall.

4. The seal of claim 3, wherein the radially inner wall of the first cartridge and the radially outer wall of the first cartridge are located between the radially inner wall of the second cartridge and the radially outer wall of the second cartridge.

5. The seal of claim 3, wherein the radially inner wall of the first cartridge is configured to contact the radially inner wall of the second cartridge.

6. The seal of claim 1, wherein the first cartridge comprises a split hoop.

7. The seal of claim 1, wherein the first direction and the second direction are opposite directions.

8. The seal of claim 1, wherein a lateral wall of the first cartridge is configured to contact and sealingly engage a first component, wherein the lateral wall of the second cartridge is configured to contact and sealingly engage a second component, and wherein a radially inner wall of the second cartridge is configured to contact and sealingly engage the second component.

9. The seal of claim 8, wherein the first component comprises a blade outer air seal, and wherein the second component comprises a turbine vane assembly.

10. A seal for a gas turbine engine, the seal comprising:
    a first annular cartridge having a radially inner wall, a radially outer wall, and a lateral wall extending between and connecting the radially inner and outer walls of the first annular cartridge,
       wherein the first annular cartridge comprises a first end having a first slot,
       wherein the first annular cartridge comprises a second end having a second slot;
    a bridge located at least partially within the first slot and at least partially within the second slot;

a second annular cartridge having a radially inner wall, a radially outer wall, and a lateral wall extending between and connecting the radially inner and outer walls of the second annular cartridge; and an annular wave spring in contact with the lateral wall of the first annular cartridge and the lateral wall of the second annular cartridge, wherein the first and second cartridges are configured to translate relative to one another and to slidingly engage one another, wherein the radially inner wall of the first cartridge and the radially outer wall of the first cartridge are located at least partially within a gape of the second cartridge.

11. The seal of claim 10, wherein the seal is configured to restrict cooling air on one side of the seal from reaching an opposite side of the seal.

12. The seal of claim 10, wherein the radially inner wall of the first annular cartridge and the radially outer wall of the first annular cartridge are located between the radially inner wall of the second annular cartridge and the radially outer wall of the second annular cartridge.

13. The seal of claim 10, wherein the seal comprises a contact member extending radially inward from the radially inner wall of the second annular cartridge.

14. The seal of claim 10, wherein the first annular cartridge is configured to form a first seal with a first gas turbine engine component, wherein the lateral wall of the second annular cartridge is configured to form a second seal with a second gas turbine engine component, wherein the radially inner wall of the second annular cartridge is configured to form a third seal with the second gas turbine engine component, and wherein the radially inner wall of the first annular cartridge is configured to form a fourth seal with the radially inner wall of the second annular cartridge.

15. The seal of claim 10, wherein the annular wave spring comprises a first node and a second node, and wherein a distance between the first node and the second node is between 0.25 and 0.5 inches.

16. The seal of claim 10, wherein at least one of the first annular cartridge and the second annular cartridge comprise a non-hardenable alloy.

17. A gas turbine engine comprising:

a first gas turbine engine component;

a second gas turbine engine component; and an annular seal positioned between the first and second components, the annular seal comprising:

a first cartridge comprising a radially inner wall and a radially outer wall, the first cartridge configured to form a first seal with the first gas turbine engine component, wherein the first cartridge comprises a first end having a first slot, wherein the first cartridge comprises a second end having a second slot;

a bridge located at least partially within the first slot and at least partially within the second slot;

a second cartridge, wherein a wall of the second cartridge is configured to form a second seal with the second gas turbine engine component, wherein the radially inner wall of the first cartridge and the radially outer wall of the first cartridge are located at least partially within a gape of the second cartridge; and a wave spring configured to exert a biasing force on the first cartridge toward the first gas turbine engine component and a biasing force on the second cartridge toward the second gas turbine engine component, wherein the annular seal fluidly isolates low and high pressure regions at least partially defined by the first and second components on opposite sides of the annular seal.

18. The gas turbine engine of claim 17, wherein the radially inner wall of the first cartridge forms a third seal with a radially inner wall of the second cartridge.

19. The gas turbine engine of claim 18, wherein the radially inner wall of the second cartridge forms a fourth seal with the second gas turbine engine component.

* * * * *